US010817043B2

(12) United States Patent
Jayavant et al.

(10) Patent No.: US 10,817,043 B2
(45) Date of Patent: Oct. 27, 2020

(54) SYSTEM AND METHOD FOR ENTERING AND EXITING SLEEP MODE IN A GRAPHICS SUBSYSTEM

(75) Inventors: Rajeev Jayavant, Sunnyvale, CA (US); Thomas E. Dewey, Menlo Park, CA (US); David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 903 days.

(21) Appl. No.: 13/191,364

(22) Filed: Jul. 26, 2011

(65) Prior Publication Data

US 2013/0027413 A1    Jan. 31, 2013

(51) Int. Cl.
*G06T 1/00* (2006.01)
*G06F 1/3234* (2019.01)

(52) U.S. Cl.
CPC ............ *G06F 1/325* (2013.01); *G06F 1/3265* (2013.01); *G06F 1/3278* (2013.01); Y02D 10/153 (2018.01); Y02D 10/157 (2018.01); Y02D 50/20 (2018.01)

(58) Field of Classification Search
CPC .... G06F 1/3287; G06F 1/3203; G06F 1/3228; G06F 1/329; G06F 1/324; G06F 1/3275; G06F 1/3265; G06F 1/3278; G06F 1/325; Y02B 60/1282; Y02B 60/32; Y02B 60/144; Y02B 60/1217; Y02B 60/1228; Y02B 60/1242; Y02B 60/126; G06T 1/20; G11C 11/4074; G11C 5/148; G11C 5/141; Y02D 10/153; Y02D 10/157; Y02D 50/20
See application file for complete search history.

(56) References Cited

U.S. PATENT DOCUMENTS

| | | | | |
|---|---|---|---|---|
| 4,016,595 | A * | 4/1977 | Compton | 257/273 |
| 4,089,058 | A * | 5/1978 | Murdock | G01L 19/083 377/32 |
| 4,523,192 | A * | 6/1985 | Burton et al. | 340/12.1 |
| 4,709,195 | A * | 11/1987 | Hellekson et al. | 318/400.03 |
| 4,747,041 | A * | 5/1988 | Engel | G06F 1/3203 307/29 |
| 5,255,094 | A * | 10/1993 | Yong et al. | 348/632 |
| 5,424,692 | A * | 6/1995 | McDonald | 333/32 |

(Continued)

FOREIGN PATENT DOCUMENTS

| | | |
|---|---|---|
| CN | 1229710 C | 11/2005 |
| CN | 1983329 A | 6/2007 |

(Continued)

OTHER PUBLICATIONS

Search and Examination Report from the UK Intellectual Property Office dated Oct. 31, 2012.

*Primary Examiner* — Charles L Beard
(74) *Attorney, Agent, or Firm* — Artegis Law Group, LLP

(57) ABSTRACT

A technique is disclosed for a graphics processing unit (GPU) to enter and exit a power saving deep sleep mode. The technique involves preserving processing state within local memory by configuring the local memory to operate in a self-refresh mode while the GPU is powered off for deep sleep. An interface circuit coupled to the local memory is configured to prevent spurious GPU signals from disrupting proper self-refresh of the local memory. Spurious GPU signals may result from GPU power down and GPU power up events associated with the GPU entering and exiting the deep sleep mode.

31 Claims, 6 Drawing Sheets

(56) References Cited

U.S. PATENT DOCUMENTS

| | | | | |
|---|---|---|---|---|
| 5,475,329 A * | 12/1995 | Jones et al. | | 327/377 |
| 5,481,731 A * | 1/1996 | Conary et al. | | 711/141 |
| 5,558,071 A * | 9/1996 | Ward et al. | | 123/598 |
| 5,596,765 A * | 1/1997 | Baum | G06F 1/3287 | 710/51 |
| 5,614,847 A * | 3/1997 | Kawahara et al. | | 326/98 |
| 5,623,677 A * | 4/1997 | Townsley et al. | | 713/310 |
| 5,625,807 A * | 4/1997 | Lee | G06F 1/3215 | 713/322 |
| 5,628,019 A * | 5/1997 | O'Brien | G06F 1/3215 | 713/322 |
| 5,630,145 A * | 5/1997 | Chen | G06F 1/3215 | 710/312 |
| 5,655,112 A * | 8/1997 | MacInnis | G06F 9/5011 | 345/501 |
| 5,727,221 A * | 3/1998 | Walsh | G06F 1/325 | 710/260 |
| 5,729,164 A * | 3/1998 | Pattantyus | | 327/110 |
| 5,758,166 A * | 5/1998 | Ajanovic | G06F 13/4059 | 710/113 |
| 5,758,170 A * | 5/1998 | Woodward et al. | | 710/267 |
| 5,761,727 A * | 6/1998 | Wu | G06F 13/1684 | 711/147 |
| 5,842,029 A * | 11/1998 | Conary et al. | | 713/322 |
| 5,844,786 A * | 12/1998 | Yoshida et al. | | 363/21.01 |
| 5,867,717 A * | 2/1999 | Milhaupt | G06F 1/08 | 712/32 |
| 5,896,140 A * | 4/1999 | O'Sullivan | G09G 5/395 | 345/536 |
| 5,914,545 A * | 6/1999 | Pollersbeck | | 307/131 |
| 5,935,253 A * | 8/1999 | Conary et al. | | 713/322 |
| 5,974,558 A | 10/1999 | Cortopassi et al. | | |
| 5,991,883 A * | 11/1999 | Atkinson | G06F 1/3203 | 345/501 |
| 6,040,845 A * | 3/2000 | Melo | G06F 1/3203 | 345/504 |
| 6,148,356 A * | 11/2000 | Archer | G06F 9/3824 | 710/307 |
| 6,199,134 B1 * | 3/2001 | Deschepper | G06F 1/3203 | 710/311 |
| 6,292,859 B1 * | 9/2001 | Santiago | G06F 13/4068 | 710/10 |
| 6,418,504 B2 * | 7/2002 | Conway | G06F 13/4045 | 710/306 |
| 6,433,785 B1 * | 8/2002 | Garcia | G06F 3/14 | 345/531 |
| 6,438,698 B1 * | 8/2002 | Hellum | G06F 1/3203 | 713/322 |
| 6,466,003 B1 * | 10/2002 | Gallavan et al. | | 324/115 |
| 6,539,486 B1 * | 3/2003 | Rolls et al. | | 713/323 |
| 6,557,065 B1 * | 4/2003 | Peleg | G06F 13/405 | 710/300 |
| 6,581,115 B1 * | 6/2003 | Arimilli | G06F 13/4022 | 710/107 |
| 6,604,161 B1 * | 8/2003 | Miller | G06F 13/24 | 710/260 |
| 6,622,178 B1 * | 9/2003 | Burke | G06F 1/3209 | 710/109 |
| 6,691,236 B1 * | 2/2004 | Atkinson | G06F 1/3203 | 713/320 |
| 6,711,691 B1 * | 3/2004 | Howard | G06F 1/3203 | 713/300 |
| 6,717,451 B1 * | 4/2004 | Klein et al. | | 327/333 |
| 6,785,829 B1 * | 8/2004 | George et al. | | 713/322 |
| 6,807,629 B1 * | 10/2004 | Billick | G06F 13/387 | 710/62 |
| 6,895,456 B2 * | 5/2005 | Olarig | G06F 13/4027 | 710/100 |
| 6,963,340 B1 * | 11/2005 | Alben et al. | | 345/501 |
| 6,985,152 B2 * | 1/2006 | Rubinstein | G06F 3/14 | 345/502 |
| 7,054,964 B2 * | 5/2006 | Chan | H04N 9/8042 | 345/530 |
| 7,058,829 B2 * | 6/2006 | Hamilton | | 713/320 |
| 7,136,953 B1 * | 11/2006 | Bisson | G06F 13/4018 | 710/307 |
| 7,426,597 B1 * | 9/2008 | Tsu | G06F 13/4018 | 710/29 |
| 7,456,833 B1 * | 11/2008 | Diard | G06T 1/20 | 345/440 |
| 7,469,311 B1 * | 12/2008 | Tsu | G06F 13/4018 | 710/307 |
| 7,548,481 B1 * | 6/2009 | Dewey et al. | | 365/227 |
| 7,598,959 B2 * | 10/2009 | Kardach | G09G 5/006 | 345/10 |
| 7,624,221 B1 * | 11/2009 | Case | G06F 13/1626 | 710/18 |
| 7,698,489 B1 * | 4/2010 | Jacoby | G06F 1/3203 | 710/301 |
| 7,800,621 B2 * | 9/2010 | Fry | G06F 1/3225 | 345/520 |
| 7,802,118 B1 * | 9/2010 | Abdalla et al. | | 713/322 |
| 7,827,424 B2 * | 11/2010 | Bounitch | G06F 1/3203 | 713/320 |
| 7,925,907 B1 * | 4/2011 | Reed | | 713/320 |
| 7,958,483 B1 * | 6/2011 | Alben | G06F 1/3203 | 713/322 |
| 8,040,351 B1 * | 10/2011 | Diard | G06T 15/005 | 345/426 |
| 8,095,813 B2 * | 1/2012 | Pernia et al. | | 713/322 |
| 8,255,708 B1 * | 8/2012 | Zhang | G06F 1/3206 | 713/300 |
| 8,325,184 B2 * | 12/2012 | Jiao | G06T 15/005 | 345/426 |
| 8,352,644 B2 * | 1/2013 | Malamant | G06F 1/3203 | 710/16 |
| 8,392,695 B1 * | 3/2013 | Lachwani et al. | | 713/2 |
| 8,621,253 B1 * | 12/2013 | Brown | G06F 1/324 | 713/320 |
| 8,635,480 B1 * | 1/2014 | Mimberg | G06F 1/325 | 713/300 |
| 8,717,371 B1 * | 5/2014 | Wyatt | G06F 3/14 | 345/502 |
| 8,762,748 B1 * | 6/2014 | Zhang | G06F 1/3206 | 713/300 |
| 8,928,907 B2 * | 1/2015 | Min | G06F 1/3206 | 358/1.14 |
| 8,941,672 B1 * | 1/2015 | Jacoby | G06F 13/14 | 345/520 |
| 8,943,347 B2 * | 1/2015 | Khodorkovsky | G06F 1/3203 | 713/300 |
| 9,047,085 B2 * | 6/2015 | Wyatt | G06F 1/325 | |
| 9,098,259 B1 * | 8/2015 | Lachwani | G06F 1/26 | |
| 9,342,131 B2 * | 5/2016 | Saito | G06F 1/266 | |
| 9,619,005 B2 * | 4/2017 | No | G06F 1/325 | |
| 9,625,976 B1 * | 4/2017 | Zhang | G06F 1/325 | |
| 10,365,706 B2 * | 7/2019 | Bakshi | G06F 1/324 | |
| 2002/0060640 A1 * | 5/2002 | Davis et al. | | 342/104 |
| 2002/0062416 A1 * | 5/2002 | Kim | G06F 1/3215 | 710/305 |
| 2002/0099980 A1 * | 7/2002 | Olarig | G06F 11/2007 | 714/43 |
| 2002/0109688 A1 * | 8/2002 | Olarig | G06F 12/1081 | 345/520 |
| 2002/0194548 A1 * | 12/2002 | Tetreault | G06F 11/0745 | 714/43 |
| 2003/0097495 A1 * | 5/2003 | Hansen | | 710/8 |
| 2003/0182487 A1 * | 9/2003 | Dennis | G06F 13/4027 | 710/305 |
| 2003/0229403 A1 * | 12/2003 | Nakazawa et al. | | 700/13 |
| 2003/0233588 A1 * | 12/2003 | Verdun | | 713/300 |
| 2004/0024941 A1 * | 2/2004 | Olarig et al. | | 710/302 |
| 2004/0138833 A1 * | 7/2004 | Flynn | | 702/58 |
| 2004/0143776 A1 * | 7/2004 | Cox | G06F 11/0793 | 714/25 |
| 2004/0155636 A1 * | 8/2004 | Fukui et al. | | 323/281 |
| 2004/0250035 A1 * | 12/2004 | Atkinson | G06F 1/3203 | 711/163 |

(56) References Cited

U.S. PATENT DOCUMENTS

| | | | |
|---|---|---|---|
| 2005/0030311 A1* | 2/2005 | Hara | G06T 11/203 345/520 |
| 2005/0060468 A1* | 3/2005 | Emerson | G06F 13/423 710/305 |
| 2005/0133932 A1 | 6/2005 | Pohl et al. | |
| 2005/0148358 A1* | 7/2005 | Lin | G06F 21/554 455/550.1 |
| 2005/0151082 A1* | 7/2005 | Coffin et al. | 250/339.06 |
| 2005/0231454 A1* | 10/2005 | Alben et al. | 345/87 |
| 2005/0259106 A1* | 11/2005 | Rai | G06F 12/06 345/564 |
| 2005/0289377 A1* | 12/2005 | Luong | G06F 1/324 713/322 |
| 2006/0020835 A1* | 1/2006 | Samson | G06F 1/3225 713/300 |
| 2006/0054610 A1* | 3/2006 | Morimoto et al. | 219/130.5 |
| 2006/0089819 A1* | 4/2006 | Dubal | G06F 21/79 702/183 |
| 2006/0106911 A1* | 5/2006 | Chapple | G06F 13/385 709/200 |
| 2006/0112287 A1* | 5/2006 | Paljug | G06F 1/3209 713/300 |
| 2006/0145328 A1 | 7/2006 | Hsu | |
| 2006/0170098 A1 | 8/2006 | Hsu | |
| 2006/0212733 A1* | 9/2006 | Hamilton | 713/300 |
| 2006/0236027 A1* | 10/2006 | Jain et al. | 711/106 |
| 2006/0245287 A1* | 11/2006 | Seitz et al. | 365/222 |
| 2006/0259801 A1* | 11/2006 | Chu | G06F 1/3203 713/300 |
| 2006/0259804 A1* | 11/2006 | Fry | G06F 1/3275 713/324 |
| 2006/0287805 A1* | 12/2006 | Enomoto et al. | 701/113 |
| 2007/0005995 A1* | 1/2007 | Kardach | G06F 1/3203 713/300 |
| 2007/0094486 A1* | 4/2007 | Moore et al. | 713/1 |
| 2007/0143640 A1* | 6/2007 | Simeral | G06F 1/28 713/320 |
| 2007/0201173 A1* | 8/2007 | Chu et al. | 361/56 |
| 2007/0212103 A1* | 9/2007 | Kikuchi | 399/88 |
| 2007/0296613 A1* | 12/2007 | Hussain | H04N 19/436 341/50 |
| 2007/0297501 A1* | 12/2007 | Hussain | H04N 19/176 375/240 |
| 2007/0300207 A1* | 12/2007 | Booth et al. | 717/126 |
| 2008/0048755 A1* | 2/2008 | Cho et al. | 327/333 |
| 2008/0117222 A1* | 5/2008 | Leroy | G06T 1/20 345/522 |
| 2008/0143731 A1* | 6/2008 | Cheng | G06T 1/20 345/502 |
| 2008/0168201 A1* | 7/2008 | de Cesare | G06F 9/4825 710/260 |
| 2008/0168285 A1* | 7/2008 | de Cesare | G06F 1/3203 713/320 |
| 2008/0180564 A1* | 7/2008 | Yamaji | 348/372 |
| 2008/0263315 A1* | 10/2008 | Zhang | G06F 9/30098 711/208 |
| 2008/0309355 A1* | 12/2008 | Nozaki et al. | 324/754 |
| 2009/0041380 A1* | 2/2009 | Watanabe | G06F 21/84 382/276 |
| 2009/0073168 A1* | 3/2009 | Jiao | G06T 15/005 345/426 |
| 2009/0077307 A1* | 3/2009 | Kaburlasos et al. | 711/106 |
| 2009/0079746 A1* | 3/2009 | Howard et al. | 345/502 |
| 2009/0096797 A1* | 4/2009 | Du et al. | 345/506 |
| 2009/0100279 A1* | 4/2009 | Lee | G06F 1/3203 713/320 |
| 2009/0153211 A1* | 6/2009 | Hendin et al. | 327/198 |
| 2009/0153540 A1* | 6/2009 | Blinzer et al. | 345/212 |
| 2009/0193234 A1* | 7/2009 | Ors et al. | 712/220 |
| 2009/0204766 A1* | 8/2009 | Jacobi et al. | 711/133 |
| 2009/0204831 A1* | 8/2009 | Cousson | G06F 1/3203 713/322 |
| 2009/0204834 A1* | 8/2009 | Hendin et al. | 713/323 |
| 2009/0204835 A1* | 8/2009 | Smith et al. | 713/323 |
| 2009/0204837 A1 | 8/2009 | Raval et al. | |
| 2009/0207147 A1* | 8/2009 | Perrot | G06F 1/3215 345/173 |
| 2009/0240892 A1* | 9/2009 | Moyer | 711/146 |
| 2009/0259982 A1* | 10/2009 | Verbeure | 716/13 |
| 2010/0007646 A1* | 1/2010 | Tsuei | G06F 1/3203 345/212 |
| 2010/0031071 A1* | 2/2010 | Lu | G06F 1/3203 713/323 |
| 2010/0058089 A1* | 3/2010 | Lerman | 713/324 |
| 2010/0064125 A1* | 3/2010 | Liu et al. | 713/2 |
| 2010/0088453 A1* | 4/2010 | Solki | G06F 13/4282 710/313 |
| 2010/0123725 A1* | 5/2010 | Azar | G06F 3/14 345/501 |
| 2010/0127407 A1 | 5/2010 | LeBlanc et al. | |
| 2010/0148316 A1 | 6/2010 | Kim et al. | |
| 2010/0157713 A1* | 6/2010 | Furutani | 365/222 |
| 2010/0177070 A1* | 7/2010 | Zhu et al. | 345/205 |
| 2010/0201340 A1* | 8/2010 | Raghavan | 323/311 |
| 2010/0220102 A1* | 9/2010 | Wyatt et al. | 345/502 |
| 2010/0281185 A1* | 11/2010 | Takayama | G06F 1/3278 710/14 |
| 2010/0309704 A1 | 12/2010 | Dattaguru et al. | |
| 2011/0029694 A1* | 2/2011 | Blinzer | G06F 1/3203 710/9 |
| 2011/0047326 A1* | 2/2011 | Kaburlasos et al. | 711/106 |
| 2011/0053649 A1* | 3/2011 | Wilson | G06F 1/24 455/566 |
| 2011/0057936 A1* | 3/2011 | Gotwalt | G06F 1/3203 345/504 |
| 2011/0060928 A1* | 3/2011 | Khodorkovsky | G06F 1/3275 713/323 |
| 2011/0109371 A1* | 5/2011 | Kastl | G06F 1/3203 327/427 |
| 2011/0143809 A1* | 6/2011 | Salomone | G06F 1/24 455/550.1 |
| 2011/0148890 A1* | 6/2011 | Kaburlasos | G06F 1/3228 345/520 |
| 2011/0157191 A1* | 6/2011 | Huang | G06F 1/3203 345/503 |
| 2011/0169840 A1* | 7/2011 | Bakalash | G06T 1/60 345/505 |
| 2011/0173476 A1* | 7/2011 | Reed | 713/323 |
| 2011/0185208 A1* | 7/2011 | Iwamoto | G06F 1/3203 713/323 |
| 2011/0215836 A1* | 9/2011 | Shimizu | 326/83 |
| 2011/0216780 A1* | 9/2011 | Zhu | H04L 12/56 370/419 |
| 2011/0221417 A1* | 9/2011 | Ishidoh et al. | 323/288 |
| 2011/0221757 A1* | 9/2011 | Hsieh | G09G 3/2096 345/522 |
| 2011/0252200 A1* | 10/2011 | Hendry | G06F 12/0831 711/121 |
| 2011/0264902 A1 | 10/2011 | Hollingworth et al. | |
| 2011/0285208 A1* | 11/2011 | Xiao | 307/82 |
| 2012/0008431 A1* | 1/2012 | Lee | 365/191 |
| 2012/0079302 A1* | 3/2012 | Ise | G06F 1/3209 713/323 |
| 2012/0133659 A1* | 5/2012 | Masnikosa | G06T 15/005 345/520 |
| 2012/0151264 A1* | 6/2012 | Balkan et al. | 714/34 |
| 2012/0204043 A1* | 8/2012 | Hamasaki | G03G 15/5004 713/320 |
| 2012/0206461 A1* | 8/2012 | Wyatt | G06F 1/3218 345/501 |
| 2012/0207208 A1* | 8/2012 | Wyatt | H04N 21/4143 375/240.01 |
| 2012/0236013 A1* | 9/2012 | Wyatt | G06F 1/3265 345/522 |
| 2012/0242671 A1* | 9/2012 | Wyatt | G09G 5/001 345/520 |
| 2012/0242672 A1* | 9/2012 | Larson | 345/522 |
| 2012/0248875 A1* | 10/2012 | Fang | 307/66 |
| 2012/0249559 A1* | 10/2012 | Khodorkovsky | G06F 1/3203 345/502 |

(56) References Cited

U.S. PATENT DOCUMENTS

| | | | |
|---|---|---|---|
| 2012/0249563 A1* | 10/2012 | Wyatt | G06F 3/14 345/522 |
| 2012/0286881 A1* | 11/2012 | Mahooti et al. | 331/47 |
| 2012/0317607 A1* | 12/2012 | Wyatt | G09G 5/006 725/127 |
| 2013/0002596 A1* | 1/2013 | Ke | G06F 1/3203 345/173 |
| 2013/0007492 A1* | 1/2013 | Sokol, Jr. | G06F 1/3206 713/322 |
| 2013/0021352 A1* | 1/2013 | Wyatt | G09G 5/395 345/520 |
| 2013/0027413 A1* | 1/2013 | Jayavant | G06F 1/325 345/520 |
| 2013/0038615 A1* | 2/2013 | Hendry | G06F 1/3265 345/502 |
| 2013/0063607 A1* | 3/2013 | Shimotono | H04N 5/232 348/187 |
| 2013/0069964 A1* | 3/2013 | Wuu | G11C 13/0004 345/530 |
| 2013/0083047 A1* | 4/2013 | Shamarao | G09G 5/003 345/547 |
| 2013/0111092 A1* | 5/2013 | Heller | G06F 13/24 710/267 |
| 2013/0111242 A1* | 5/2013 | Heller | G06F 1/3206 713/323 |
| 2013/0151881 A1* | 6/2013 | Chen | G06F 1/3296 713/323 |
| 2013/0159741 A1* | 6/2013 | Schluessler | G06F 1/206 713/320 |
| 2013/0159750 A1* | 6/2013 | Branover | G06F 1/3203 713/323 |
| 2013/0194286 A1* | 8/2013 | Bourd | G06F 9/52 345/545 |
| 2013/0198548 A1* | 8/2013 | No | G06F 1/3253 713/323 |
| 2013/0235053 A1* | 9/2013 | Bourd | G06T 1/20 345/522 |
| 2013/0265307 A1* | 10/2013 | Goel | G06T 15/005 345/426 |
| 2013/0318278 A1* | 11/2013 | Wu | G06F 13/385 710/313 |
| 2013/0332764 A1* | 12/2013 | Juang | H04L 49/109 713/324 |
| 2013/0346640 A1* | 12/2013 | Gui | G06F 13/10 710/14 |
| 2014/0092103 A1* | 4/2014 | Saulters | G06F 1/206 345/501 |
| 2014/0092109 A1* | 4/2014 | Saulters | G09G 5/395 345/522 |
| 2014/0181806 A1* | 6/2014 | Abiezzi | G06F 9/45558 718/1 |
| 2014/0181807 A1* | 6/2014 | Fonseca | G06F 9/5083 718/1 |
| 2014/0184629 A1* | 7/2014 | Wyatt | G09G 5/393 345/547 |
| 2014/0232731 A1* | 8/2014 | Holland | G06F 1/3228 345/531 |
| 2014/0258738 A1* | 9/2014 | Greenwalt | G06F 1/3206 713/300 |
| 2014/0344599 A1* | 11/2014 | Branover | G06F 1/3287 713/323 |
| 2014/0380028 A1* | 12/2014 | Cheng | G06F 9/45558 713/1 |
| 2015/0153818 A1* | 6/2015 | Jeon | G06F 1/3287 713/323 |
| 2015/0193062 A1* | 7/2015 | Wyatt | G06F 3/0416 345/173 |
| 2015/0194137 A1* | 7/2015 | Wyatt | G09G 5/393 345/173 |
| 2015/0379670 A1* | 12/2015 | Koker | G06T 1/20 345/502 |
| 2016/0150130 A1* | 5/2016 | Noro | G06T 1/20 348/516 |
| 2016/0209900 A1* | 7/2016 | Blayvas | G06F 1/28 |
| 2016/0292812 A1* | 10/2016 | Wu | G06F 1/3237 |
| 2016/0370844 A1* | 12/2016 | Kumar | G06F 3/0416 |
| 2016/0378709 A1* | 12/2016 | Menachem | G06F 11/3027 710/308 |
| 2017/0061568 A1* | 3/2017 | Metz | G06T 1/20 |
| 2017/0154005 A1* | 6/2017 | Ahmed | G06F 13/4081 |
| 2017/0199542 A1* | 7/2017 | Sylvester | G06F 13/16 |
| 2017/0277643 A1* | 9/2017 | Zhou | G06F 1/3234 |
| 2018/0232034 A1* | 8/2018 | DiBene, II | G06F 1/3206 |
| 2018/0293205 A1* | 10/2018 | Koker | G06F 9/3004 |
| 2019/0056955 A1* | 2/2019 | Pennala | G06F 9/45558 |
| 2019/0235615 A1* | 8/2019 | Shows | G06F 1/3293 |
| 2019/0303322 A1* | 10/2019 | Sharma | G06F 1/3206 |
| 2020/0135151 A1* | 4/2020 | Jiang | G06F 9/451 |

FOREIGN PATENT DOCUMENTS

| | | |
|---|---|---|
| EP | 1 951 015 A1 | 7/2008 |
| TW | 200923784 A | 6/2009 |
| WO | 2008067258 A2 | 6/2008 |

* cited by examiner

SYSTEM AND METHOD FOR ENTERING AND EXITING SLEEP MODE IN A GRAPHICS SUBSYSTEM

BACKGROUND OF THE INVENTION

Field of the Invention

The invention relates generally to graphics processing systems and, more specifically, to a system and method for entering and exiting sleep mode in a graphics subsystem.

Description of the Related Art

Certain computer systems include a graphics processing unit (GPU) configured to perform computational tasks in cooperation with a central processing unit (CPU). During normal operation, the GPU may be assigned the computational tasks as needed. Data and program code related to the computational tasks are conventionally stored within a local memory system comprising one or more memory devices. Certain state information related to the computational tasks may be stored on the GPU. Between performing the computational tasks, the GPU may remain idle for predictable spans of time. During a span of idle time, the GPU may be put in a sleep mode to reduce power consumption. One type of sleep mode involves gating off a primary clock signal to one or more clock domains within the GPU. Gating off the primary clock signal can beneficially reduce dynamic power consumption. However, modern fabrication technology that enables the manufacture of advanced GPU devices with extremely dense circuitry inevitably introduces significant static power dissipation, which is present whenever the GPU device is powered on.

To address static power dissipation during spans of idle time, a second sleep mode, referred to herein as a deep sleep mode, involves actually shutting off power to the GPU. The deep sleep mode further reduces average power consumption by eliminating both dynamic and static power consumption associated with portions of the GPU circuitry that enter the deep sleep mode.

Prior to entering the deep sleep mode, operating state information for the GPU needs to be saved to system memory, which is configured to preserve the operating state information, which may include certain contents of the local memory as well as certain portions of internal GPU state. The operating state information needs to be restored within the GPU and local memory prior to the GPU resuming operation and immediately following an exit from the deep sleep mode. Each time the GPU is conventionally put into deep sleep, the operating state information is transmitted to a main memory associated with the CPU. Each time the GPU conventionally exists deep sleep, the operating state information is transmitted from the main memory to the GPU and local memory. Entering and exiting deep sleep involves transmitting significant amounts of state information between system memory and the GPU. As a consequence, use of the deep sleep mode can be very time consuming and lead to overall system performance degradation.

As the foregoing illustrates, what is needed in the art is an improved technique for entering and exiting a deep sleep mode in a graphics processing unit.

SUMMARY OF THE INVENTION

One embodiment of the present invention sets forth a method implemented by a graphics processing unit (GPU) for entering and exiting sleep mode. The method includes receiving a command to enter a sleep mode, saving internal processing state for the GPU to a memory system local to the GPU, causing at least one memory device included in the memory system to enter a self-refresh mode, and entering a power-down state.

Another embodiment of the present invention sets forth a computer-readable storage medium including instructions that, when executed by a processor, cause the processor to perform the method steps set forth above. Yet another embodiment of the present invention sets forth a computing device configured to implement the method steps set forth above.

One advantage of the disclosed technique is that a GPU may efficiently enter and exit a deep sleep power saving mode by leveraging low power self-refresh modes available from locally attached memory. By contrast, prior art systems do not benefit from maintaining GPU context within local memory.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
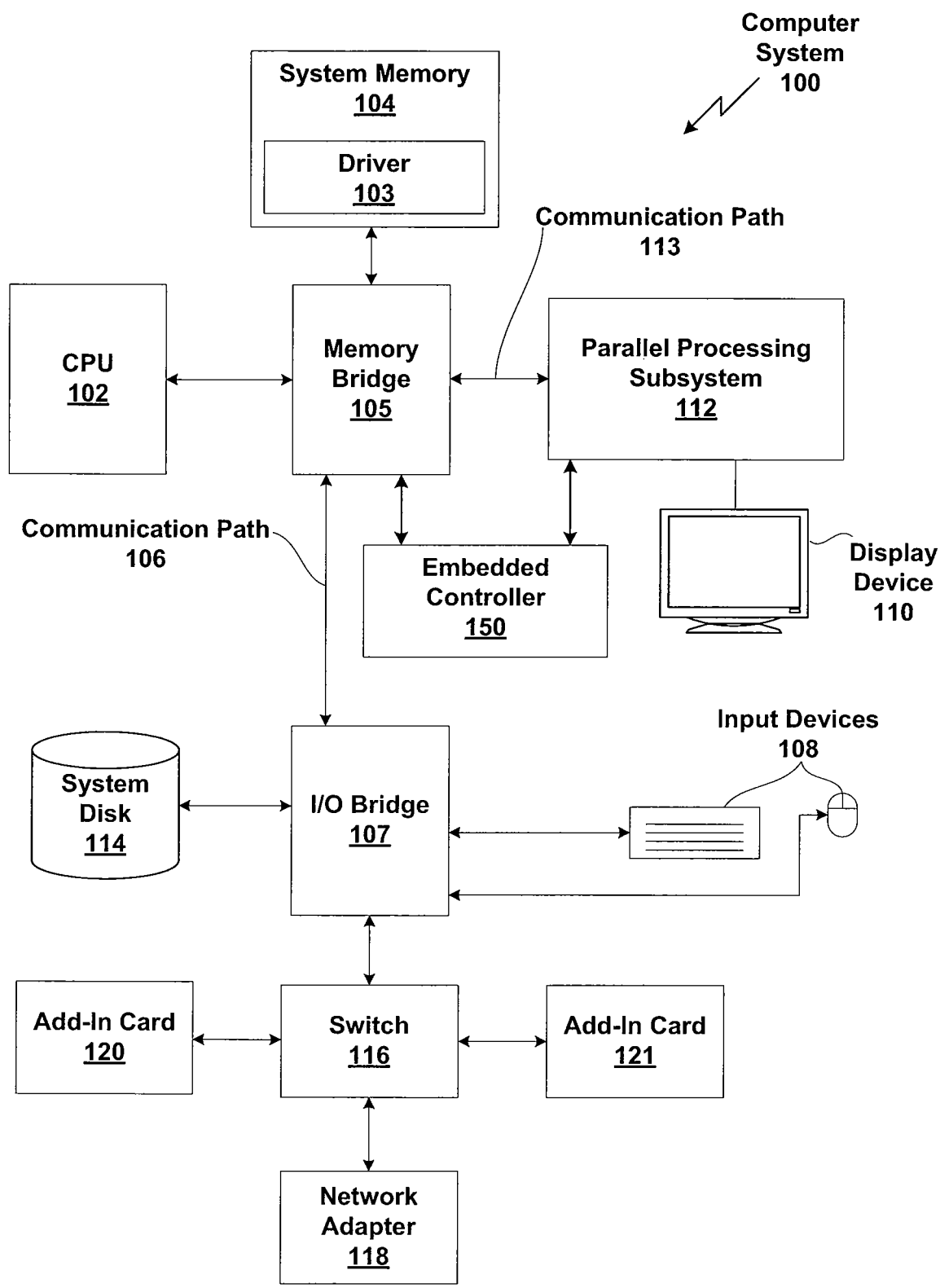
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 configured to communicate via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communications path 106 and memory bridge 105. A parallel processing subsystem 112 is coupled to memory bridge 105 via a bus or other communication path 113 (e.g., a PCI Express, Accelerated Graphics Port, or HyperTransport link). In one embodiment parallel processing subsystem 112 is a graphics subsystem that delivers pixels to a display device 110 (e.g., a conventional CRT or LCD based monitor). A parallel processing subsystem, driver 103 is configured to manage the parallel processing subsystem 112. The parallel processing subsystem driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121.

An embedded controller 150 is coupled to the parallel processing subsystem 112. In one embodiment, the embedded controller 150 is also coupled to the CPU 102 via an interconnect path that may include the memory bridge 105. Alternatively, the embedded controller 150 is coupled to the CPU 102 via the I/O bridge 107. As described in greater detail below, embedded controller 150 is configured to manage certain operational aspects of the parallel processing subsystem 112.

Other components (not explicitly shown), including universal serial bus (USB) connections or other port connections, CD drives, DVD drives, film recording devices, and the like, may also be connected to either the memory bridge 105, or the I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s). The connections between different devices may use any technically feasible protocols.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as needed for a specific implementation. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 are integrated into a single chip. Certain embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
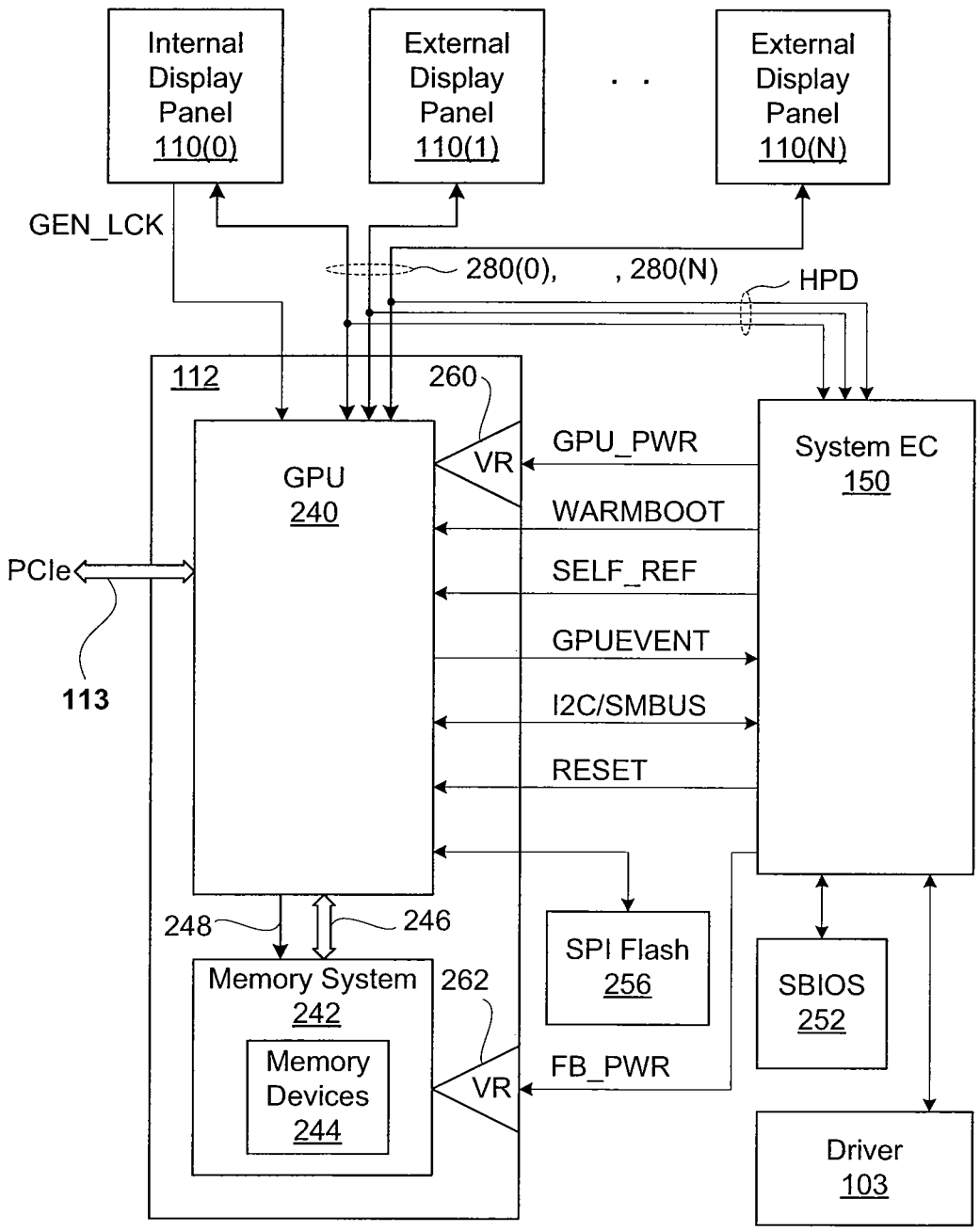
FIG. 2 illustrates communication signals between a parallel processing subsystem and various components of the computer system, according to one embodiment of the present invention.

FIG. 2 illustrates communication signals between parallel processing subsystem 112 and various components of computer system 100, according to one embodiment of the present invention. A detail of computer system 100 is shown, illustrating the embedded controller (EC) 150, an SPI flash device 256, a system basic input/output system (SBIOS) 252, and the driver 103. EC 150 may be an embedded controller that implements an advanced configuration and power interface (ACPI) that allows an operating system executing on CPU 102 to configure and control the power management of various components of computer system 100. In one embodiment, EC 150 allows the operating system executing on CPU 102 to communicate with GPU 240 via driver 103 even when the communications path 113 is disabled. In one embodiment, the communication path 113 comprises a PCIe bus, which may be enabled during active operation of the GPU 240 or disabled to save power when the GPU 240 is in a power saving (sleep) mode. For example, if GPU 240 and the PCIe bus are shut down in a power saving mode, the operating system executing on CPU 102 may instruct EC 150 to wake-up GPU 240 by sending a notify ACPI event to EC 150 via driver 103.

The GPU 240 is coupled to a local memory system 242 via a memory interface bus 246. Data transfers via the memory interface bus 246 are enabled via memory clock enable signal CKE 248. The local memory system 242 comprises memory devices 244, such as dynamic random access memory (DRAM) devices.

Computer system 100 may include multiple display devices 110 such as an internal display panel 110(0) and one or more external display panels 110(1) to 110(N). Each of the one or more display devices 110 may be connected to GPU 240 via communication paths 280(0) to 280(N). In one embodiment, hot-plug detect (HPD) signals included in communication paths 280 are also connected to EC 150. When one or more display devices 110 are operating in a panel self-refresh mode, EC 150 may be responsible for monitoring HPD signals and waking-up GPU 240 if EC 150 detects a hot-plug event or an interrupt request from one of the display devices 110.

In one embodiment, a video generation lock (GEN_LCK) signal is included between internal display device 110(0) and GPU 240. The GEN_LCK signal transmits a synchronization signal from the display device 110(0) to GPU 240. The GEN_LCK signal may be used by certain synchronization functions implemented by display device 110(0). For example, GPU 240 may synchronize video signals generated from pixel data in memory devices 244 with the GEN_LCK signal. GEN_LCK may indicate the start of the active frame, for example, by transmitting an internal vertical sync signal to GPU 240.

EC 150 transmits a GPU power enable (GPU_PWR) and frame buffer power enable (FB_PWR) signals to voltage regulators (VR) 260 and 262, configured to provide a supply voltage to the GPU 240 and memory devices 244, respectively. EC 150 also transmits the WARMBOOT, self-refresh enable (SELF_REF) and RESET signals to GPU 240 and receives a GPUEVENT signal from GPU 240. Finally, EC 150 may communicate with GPU 240 via an industry standard "I2C" or "SMBus" data bus. The functionality of these signals is described below.

The GPU_PWR signal controls the voltage regulator 260 that provides GPU 240 with a supply voltage. When display device 110 enters a self-refresh mode, an operating system executing on CPU 102 may instruct EC 150 to kill power to GPU 240 by making a call to driver 103. The EC 150 will then drive the GPU_PWR signal low to kill power to GPU 240 to reduce the overall power consumption of computer system 100. Similarly, the FB_PWR signal controls the voltage regulator that provides memory devices 244 with a supply voltage. When display device 110 enters a self-refresh mode, computer system 100 may also kill power to memory devices 244 in order to further reduce overall power consumption of computer system 100. The FB_PWR signal is controlled in a similar manner to the GPU_PWR signal. The RESET signal may be asserted during wake-up of the GPU 240 to hold GPU 240 in a reset state while the voltage regulators that provide power to GPU 240 and memory devices 244 are allowed to stabilize.

The WARMBOOT signal is asserted by EC 150 to indicate that GPU 240 should restore an operating state from SPI flash device 256 instead of performing a full, cold-boot sequence. In one embodiment, when display device 110 enters a panel self-refresh mode, GPU 240 may be configured to save a current state in SPI flash device 256 before GPU 240 is powered down. GPU 240 may then restore an operating state by loading the saved state information from SPI flash device 256 upon waking-up. Loading the saved state information reduces the time required to wake-up GPU 240 relative to performing a full, cold-boot sequence. Reducing the time required to wake-up GPU 240 is advantageous during high frequency entry and exit into a panel self-refresh mode. In this scenario, power to the memory devices 244 may be held on to allow the memory devices 244 to operate in a low power self-refresh mode, thereby expediting a warm boot of the GPU 240.

The SELF_REF signal is asserted high (self-refresh is active) by EC 150 when display device 110 is operating in a panel self-refresh mode. The SELF_REF signal indicates to GPU 240 that display device 110 is currently operating in a panel self-refresh mode and that communications path 280 should be quiescent. In one embodiment, GPU 240 may connect one or more signals within the communications path 280 to ground through weak, pull-down resistors when the SELF_REF signal is asserted.

The GPUEVENT signal allows the GPU 240 to indicate to CPU 102 that an event has occurred, even when the PCIe bus is off. GPU 240 may assert the GPUEVENT to alert system EC 150 to configure the I2C/SMBUS to enable communication between the GPU 240 and the system EC 150. The I2C/SMBUS is a bidirectional communication bus configured as an I2C, SMBUS, or other bidirectional communication bus configured to enable GPU 240 and system EC 150 to communicate. In one embodiment, the PCIe bus may be shut down when display device 110 is operating in a panel self-refresh mode. The operating system may notify GPU 240 of events, such as cursor updates or a screen refresh, through system EC 150 even when the PCIe bus is shut down.

Figure 3A:
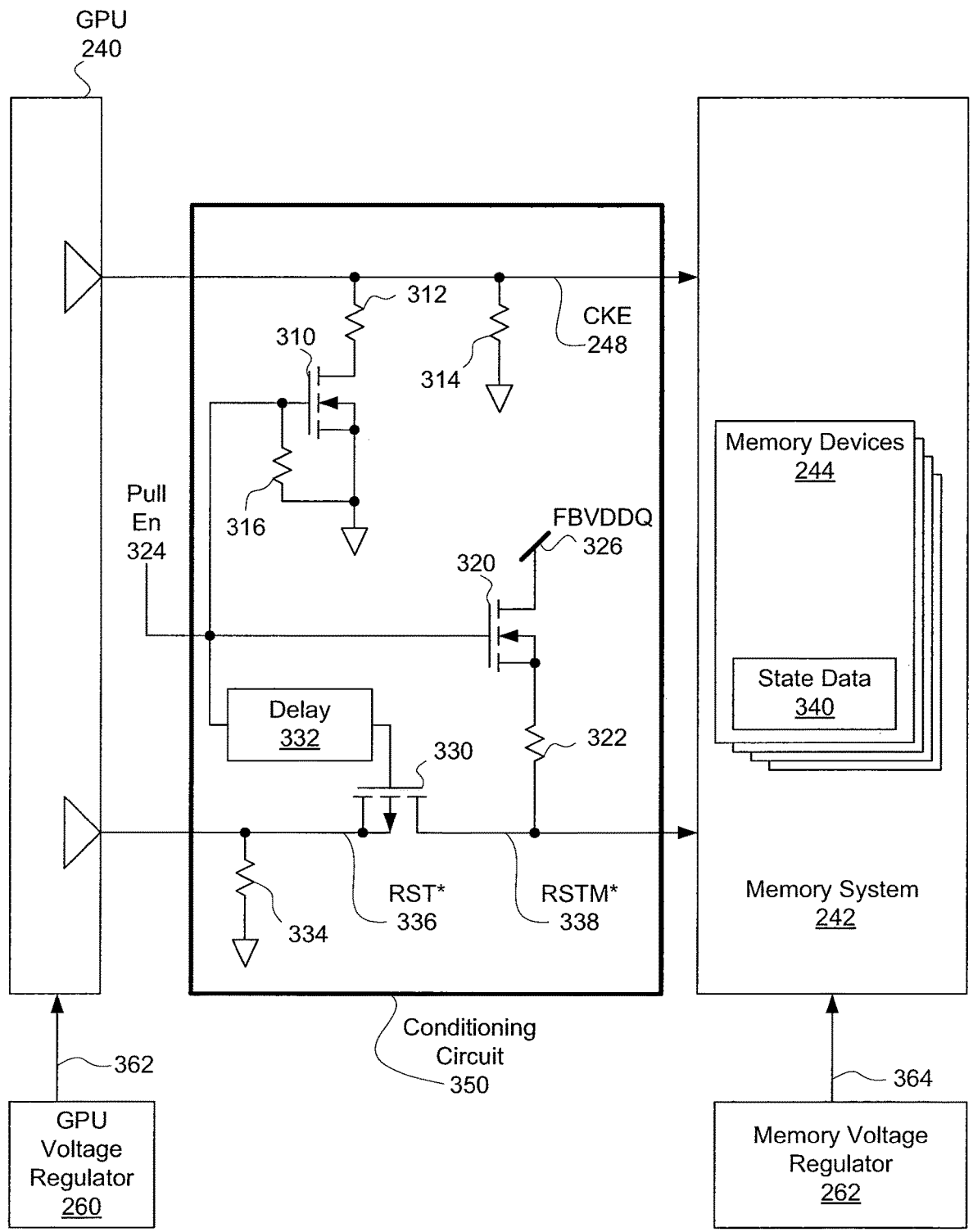
FIG. 3A is a detailed illustration of an external conditioning circuit, according to one embodiment of the present invention.

FIG. 3A is a detailed illustration of an external conditioning circuit 350, according to one embodiment of the present invention. The conditioning circuit 350 is configured to remove glitches from the memory clock enable signal CKE 248 of FIG. 2 during transitions between operating modes. Specifically, when the memory system 242 is in a self-refresh state, removing glitches from CKE 248 enables the memory system 242 to reliably operate in the self-refresh state. The operating modes may include, without limitation, power saving and normal modes of operation for the GPU 240 and memory system 242. The conditioning circuit 350 comprises field-effect transistor (FET) 310, resistors 312-316, FET 320, FET 330, resistors 322 and 334, and delay circuit 332. When signal pull enable 324 is asserted high, the conditioning circuit 350 pulls CKE 248 low and RSTM* 338 high ("*" indicates an active low signal). In one embodiment, resistor 312 is approximately two orders of magnitude lower in resistance than resistors 314 and 316, to provide a relatively strong pull down path through resistor 312 and FET 310. For example, resistor 312 may be one hundred ohms, while resistors 314 and 316 may be ten thousand ohms. Furthermore, resistor 322 may be approximately two orders of magnitude lower in resistance than resister 334. For example, resistor 322 may be one hundred ohms, while resistor 334 may be ten thousand ohms. When pull enable 324 is asserted high, FET 320 is turned on to pull RSTM* 338 high, which de-asserts reset to the memory system 242. With reset de-asserted, the memory system 242 may operate in self-refresh mode. When pull enable 324 is asserted high, FET 330 is also turned off, isolating RST* 336 from the RSTM* 338 signal. When pull enable 324 is asserted low, FETs 310 and 320 are turned off, disabling pull-down of CKE 248 and pull-up of RSTM* 338 by the conditioning circuit 350. When pull enable 324 is asserted low, FET 330 is also turned on, coupling RST* 336 to the RSTM* 338 signal, allowing the GPU 240 to control reset state of the memory system 242. Delay circuit 332 may be configured to delay when FET 330 is turned on and off with respect to FETS 310 and 320.

During active operation, the GPU 240 transmits command information and data to the memory devices 244, by clocking the command information and data via to the memory devices 244 when the memory clock enable signal CKE 248 is active. In one embodiment, the SELF_REF signal, which is generated by system EC 150 of FIG. 1, is coupled to and drives the pull enable 324 signal. When SELF_REF is asserted high (for power saving self refresh mode), CKE 248 is pulled low via FET 310 and resistor 312, and RSTM* 338 is pulled high to FBVDDQ 326 via FET 320 and resistor 322. When SELF_REF is asserted low, the GPU 240 is allowed to enter active operation. During active operation, voltage regulator 260 is enabled to generate GPU supply voltage 362, and voltage regulator 262 is enabled to generate memory supply voltage 364. In one embodiment, FBVDDQ 326 is coupled to memory supply voltage 364.

To enter a deep sleep mode, wherein the GPU 240 is powered off, the memory devices 244 are configured to enter self-refresh mode to preserve data within the memory devices 244. When the pull enable 324 signal is asserted high (active) by the system EC 150, memory devices 244 are configured to operate in a self-refresh mode, which can potentially be interrupted if a spurious enable signal is received on CKE 248. When GPU 240 is powered on or powered off, circuitry within the GPU 240 may generate a spurious signal, such as an active sense spike, on CKE 248 and disrupt proper self-refresh operation of the memory devices 244. To avoid generating a spurious signal on CKE 248, the conditioning circuit 350 shunts (clamps) CKE 248 to ground via resistor 312 and FET 310 when self-refresh is active and the pull enable 324 signal is high. Prior to powering off the GPU 240 or powering on the GPU 240, CKE 248 is shunted to ground, thereby removing spurious signals from CKE 248. The conditioning circuit 350 is powered by a power domain that is isolated from GPU supply voltage 362. For example, the conditioning circuit 350 may be powered by memory supply voltage 364.

During normal operation, the GPU 240 generates and stores state data 340 within the memory devices 244. When the GPU 240 is powered-off, the self-refresh mode of memory devices 244 is used to preserve the state data 340. In one embodiment, the state data 340 comprises stored program and data information related to operations performed by the GPU 240. In an alternative embodiment, the state data 340 also includes internal state information conventionally stored exclusively within the GPU 240 during normal operation. In such an embodiment, the internal state information is written to the memory devices 244 prior to the GPU 240 being shut down for deep sleep operation, and prior to the memory devices 244 being put in self-refresh mode. Alternatively, the internal state information may be written to SPI flash 256 prior to the GPU 240 being shut down for deep sleep operation.

Figure 3B:
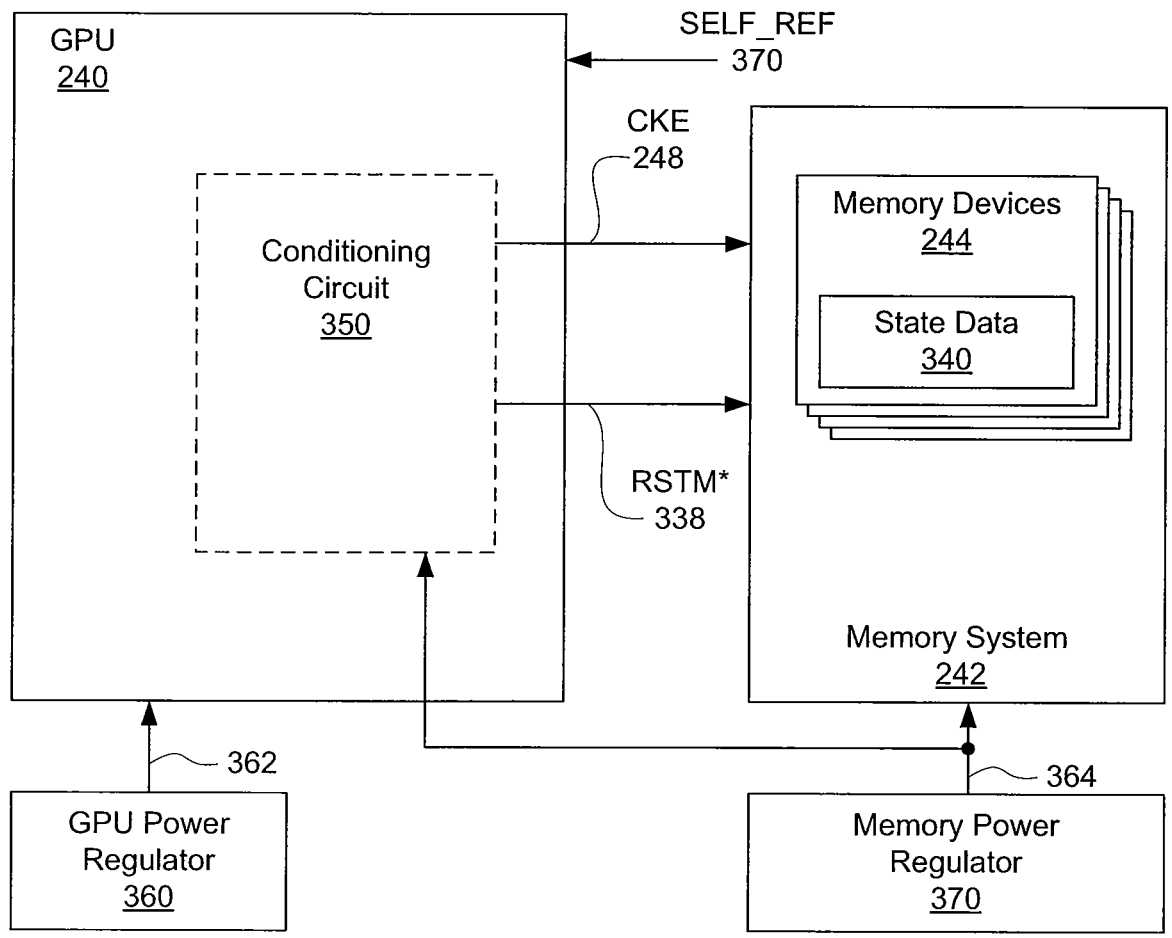
FIG. 3B is a detailed illustration of an integrated conditioning circuit, according to one embodiment of the present invention.

FIG. 3B is a detailed illustration of an integrated memory clock deglitching circuit 350, according to another embodiment of the present invention. In this embodiment, the conditioning circuit 350 is integrated within the GPU 240. Importantly, however, the conditioning circuit 350 is configured to operate from a separate power domain, such as from memory supply voltage 364, received from memory power regulator 370. GPU 240 receives GPU supply voltage 362 from GPU power regulator 360. Techniques for fabricating on-chip circuitry having isolated power domains are known in the art, and any such techniques may be employed to implement the conditioning circuit 350 without departing the scope of the present invention.

Figure 4A:
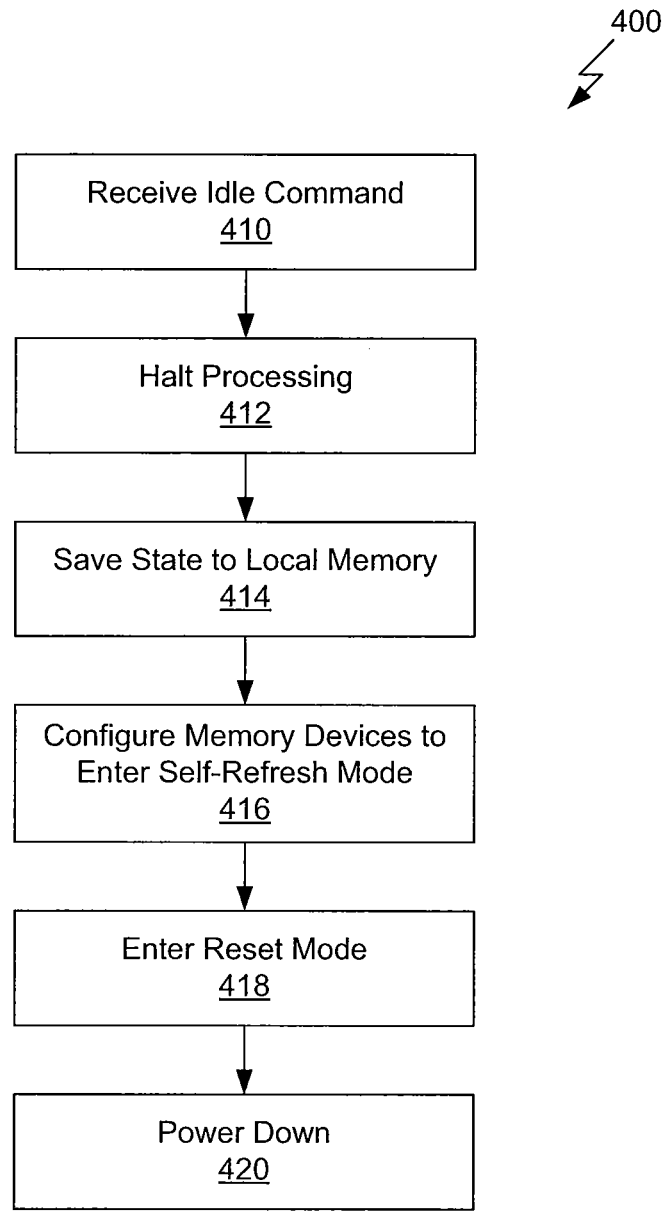
FIG. 4A sets forth a flowchart of method steps for causing the parallel processing system to enter a deep sleep state, according to one embodiment of the present invention.

FIG. 4A sets forth a flowchart of method steps 400 for causing the parallel processing system to enter a deep sleep state, according to one embodiment of the present invention. Although the method steps are described in conjunction with the systems of FIGS. 1-3B persons skilled in the art will understand that any system configured to perform the method steps, in any order, is within the scope of the invention.

The method begins in step 410, where the GPU 240 receives a command to transition to an idle state. In step 412, the GPU 240 halts processing. At this point, incoming commands may be stalled, any processing queues may be drained, and any pending requests completed or retired. After this step is complete, internal GPU state comprises primarily configuration and status information that may be readily saved. In step 414, the GPU 240 saves internal GPU state to a local memory. In one embodiment, the GPU 240 saves the internal GPU state to the memory devices 244. In an alternative embodiment, the GPU 240 saves the internal GPU state to a locally attached flash storage device, such as SPI flash 256. In step 416, the GPU 240 configures the memory devices 244 to enter self-refresh mode. At this point, the memory devices 244 are able to preserve stored data indefinitely while consuming relatively little power. In step 418, the GPU 240 enters a reset mode. While the GPU 240 enters the reset mode, the system EC 150 drives the SELF_REF signal active. In step 420, the GPU 240 powers down. The method terminates in step 420.

Figure 4B:
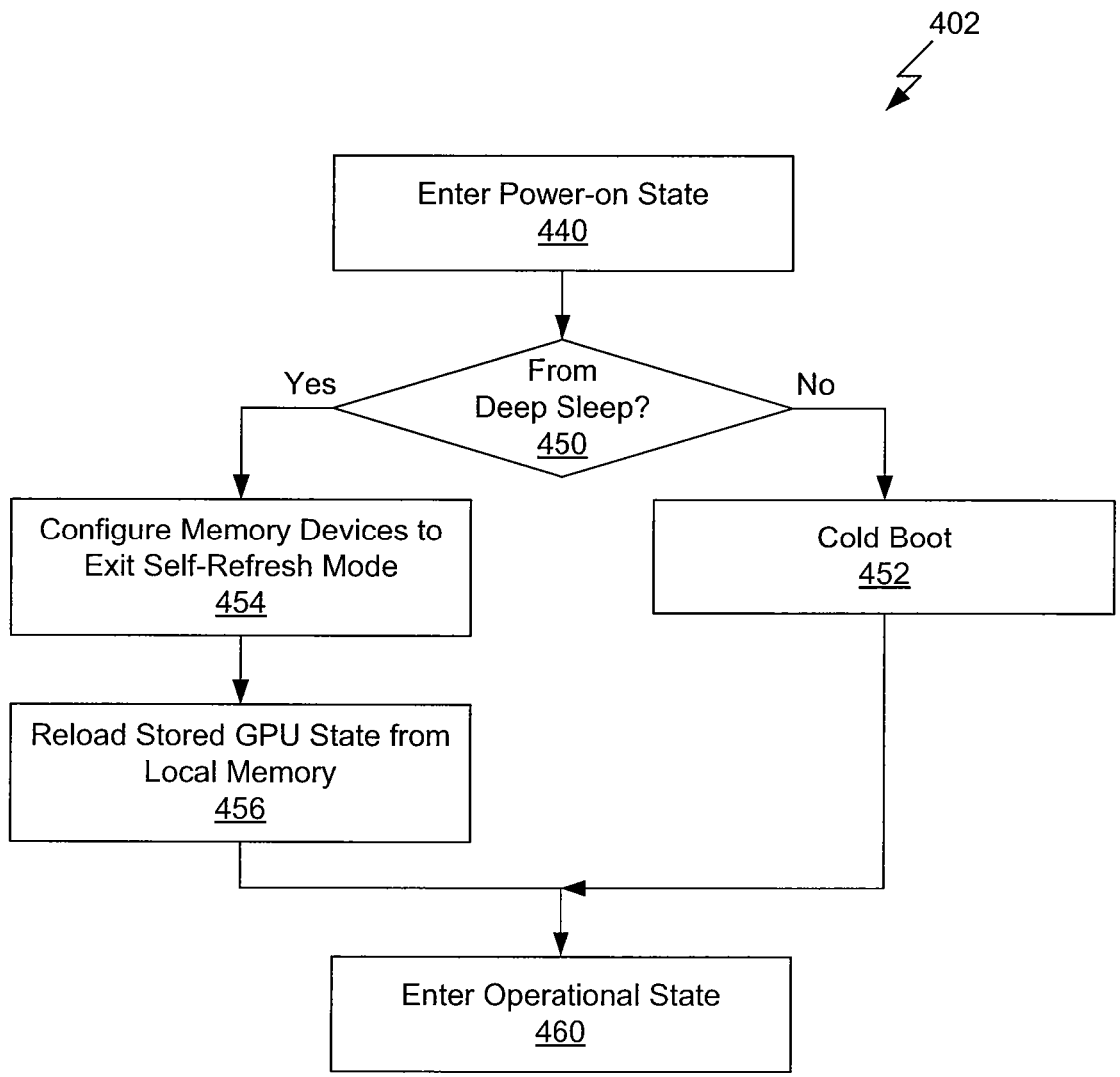
FIG. 4B sets forth a flow chart of method steps for causing the parallel processing system to exit the deep sleep state, according to one embodiment of the present invention.

FIG. 4B sets forth a flow chart of method steps 402 for causing the parallel processing system to exit the deep sleep state, according to one embodiment of the present invention. Although the method steps are described in conjunction with the systems of FIGS. 1-3B persons skilled in the art will understand that any system configured to perform the method steps, in any order, is within the scope of the invention.

The method begins in step 440, where the GPU 240 enters a power-on state from a powered off state. If, in step 450, the GPU 240 is entering the power-on state from deep sleep, then the method proceeds to step 454. In one embodiment, the GPU 240 determines that the power-on state follows a deep sleep state by examining the SELF_REF signal. If the GPU 240 powered-on with the SELF_REF signal asserted high, then the GPU 240 is entering the power-on state from a deep sleep state. After the GPU 240 powers on, the system EC 150 de-asserts the SELF_REF signal. In step 454, the GPU 240 configures the memory devices 244 to exit self-refresh mode. In step 456, the GPU 240 reloads stored internal GPU state from the local memory. In one embodiment, the internal GPU state is stored in memory devices 244. In an alternative embodiment, the internal GPU state is stored in a local flash device, such as SPI flash 256. After reloading internal GPU state, the GPU 240 may resume normal operation. In step 460, the GPU 240 resumes normal operation by entering an operational state. The method terminates in step 460.

Returning to step 450, if the GPU 240 is not entering the power-on state from deep sleep, then the method proceeds to step 452. In step 452, the GPU 240 performs a conventional cold boot.

In sum, a technique is disclosed for a GPU to enter and exit a deep sleep mode. The GPU is able to efficiently enter a deep sleep mode by storing certain processing context within locally attached memory. The GPU is able to efficiently exit the deep sleep mode by having access to state information that is preserved while the GPU is powered off.

One advantage of the disclosed technique is that a GPU may efficiently enter and exit a deep sleep power saving mode by leveraging low power self-refresh modes available from locally attached memory. By contrast, prior art systems do not benefit from maintaining GPU context within local memory.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method implemented by a graphics processing unit (GPU) for entering and exiting sleep mode, the method comprising:

receiving a command for the GPU to enter a sleep mode; and in response to receiving the command for the GPU to enter the sleep mode, performing the steps of:
- saving an internal processing state of the GPU to a memory system local to the GPU;
- causing at least one enable signal used for controlling transmission of data between the GPU and the memory system to be clamped to a fixed voltage prior to entering a power-down state;
- causing a first communications bus that couples the GPU to a central processing unit (CPU) to be disabled;
- causing at least one memory device included in the memory system to enter a self-refresh mode;
- transmitting a signal to an embedded controller to enable a second communications bus that couples the embedded controller to the GPU; and
- entering the power-down state.

2. The method of claim 1, further comprising stalling all incoming workloads and completing all in-progress processing in order to halt processing within the GPU.

3. The method of claim 1, wherein the at least one memory device comprises a dynamic random access memory (DRAM) device, and the step of saving comprises copying the internal processing state for the GPU to the DRAM device.

4. The method of claim 1, wherein the at least one memory device comprises a non-volatile memory, and the step of saving comprises copying the internal processing state for the GPU and a memory interface state to the non-volatile memory.

5. The method of claim 4, wherein the non-volatile memory comprises at least one flash memory device coupled to the GPU via an interface that is independent of an interface to a different memory device within the memory system.

6. The method of claim 1, wherein the GPU and memory system are configured to operate at a predetermined speed and operating state prior to entering the power-down state.

7. The method of claim 1, further comprising:
- entering a power-on state;
- determining that the power-on state is associated with the sleep mode;
- causing the at least one memory device included in the memory system to exit the self-refresh mode;
- reloading the internal processing state for the GPU from the memory system to the GPU.

8. The method of claim 7, further comprising performing a power-on reset of the GPU and detecting a warm-boot state for transitioning the GPU from the power-down state to the power-on state.

9. The method of claim 7, wherein the at least one memory device comprises a DRAM device, and the step of reloading comprises copying the internal processing state for the GPU from the DRAM device to the GPU.

10. The method of claim 9, wherein the at least one memory device comprises a non-volatile memory device, and the step of reloading comprises copying the internal processing state for the GPU and a DRAM interface state from the non-volatile memory device to the GPU.

11. The method of claim 10, wherein the non-volatile memory device comprises at least one flash memory device, coupled to the GPU via an interface that is independent of the DRAM device.

12. The method of claim 7, wherein the GPU and the memory system are configured to operate at a predetermined speed and operating state prior to entering the power-on state.

13. The method of claim 7, further comprising causing at least one enable signal used for controlling transmission of data between the GPU and the memory system to be clamped to a fixed voltage prior to exiting the power-on state.

14. The method of claim 10, wherein a portion of the internal processing state for the GPU and the DRAM interface state are restored to a previously configured state based on data stored within the non-volatile memory.

15. The method of claim 1, wherein the CPU is configured to communicate with the GPU when the first communications bus is disabled.

16. The method of claim 1, wherein the CPU is configured to notify the GPU of cursor updates and screen refreshes when the first communications bus is disabled.

17. A non-transitory computer-readable storage medium including instructions that, when executed by a graphics processing unit (GPU), cause the GPU to enter and exit a sleep mode, by performing the steps of:
- receiving a command for the GPU to enter a sleep mode; and
- in response to receiving the command for the GPU to enter the sleep mode, performing the steps of:
  - saving an internal processing state of the GPU to a memory system local to the GPU;
  - causing at least one enable signal used for controlling transmission of data between the GPU and the memory system to be clamped to a fixed voltage prior to entering a power-down state;
  - causing a first communications bus that couples the GPU to a central processing unit (CPU) to be disabled;
  - causing at least one memory device included in the memory system to enter a self-refresh mode;
  - transmitting a signal to an embedded controller to enable a second communications bus that couples the embedded controller to the GPU; and
  - entering the power-down state.

18. The non-transitory computer-readable storage medium of claim 17, further comprising stalling all incoming workloads and completing all in-progress processing in order to halt processing within the GPU.

19. The non-transitory computer-readable storage medium of claim 17, wherein the at least one memory device comprises a dynamic random access memory (DRAM) device, and the step of saving comprises copying the internal processing state for the GPU to the DRAM device.

20. The non-transitory computer-readable storage medium of claim 17, wherein the at least one memory device comprises a non-volatile memory, and the step of saving comprises copying the internal processing state for the GPU and a memory interface state to the non-volatile memory.

21. The non-transitory computer-readable storage medium of claim 20, wherein the non-volatile memory comprises at least one flash memory device coupled to the GPU via an interface that is independent of an interface to a different memory device within the memory system.

22. The non-transitory computer-readable storage medium of claim 17, wherein the GPU and memory system are configured to operate at a predetermined speed and operating state prior to entering the power-down state.

23. The non-transitory computer-readable storage medium of claim 17, further comprising:
- entering a power-on state;
- determining that the power-on state is associated with the sleep mode;

causing the at least one memory device included in the memory system to exit the self-refresh mode;

reloading the internal processing state for the GPU from the memory system to the GPU.

24. The non-transitory computer-readable storage medium of claim 23, further comprising performing a power-on reset of the GPU and detecting a warm-boot state for transitioning the GPU from the power-down state to the power-on state.

25. The non-transitory computer-readable storage medium of claim 23, wherein the at least one memory device comprises a DRAM device, and the step of reloading comprises copying the internal processing state for the GPU from the DRAM device to the GPU.

26. The non-transitory computer-readable storage medium of claim 25, wherein the at least one memory device comprises a non-volatile memory device, and the step of reloading comprises copying the internal processing state for the GPU and a DRAM interface state from the non-volatile memory device to the GPU.

27. The non-transitory computer-readable storage medium of claim 26, wherein the non-volatile memory device comprises at least one flash memory device, coupled to the GPU via an interface that is independent of the DRAM device.

28. The non-transitory computer-readable storage medium of claim 23, wherein the GPU and the memory system are configured to operate at a predetermined speed and operating state prior to entering the power-on state.

29. The non-transitory computer-readable storage medium of claim 23, further comprising causing at least one enable signal used for controlling transmission of data between the GPU and the memory system to be clamped to a fixed voltage prior to exiting the power-on state.

30. The non-transitory computer-readable storage medium of claim 26, wherein a portion of the internal processing state for the GPU and the DRAM interface state are restored to a previously configured state based on data stored within the non-volatile memory.

31. A computing device, comprising:

a memory system configured to operate in an active mode and a low power self-refresh mode;

an isolation circuit coupled to the memory system and configured to cause at least one enable signal used for controlling transmission of data between a graphics processing unit (GPU) and the memory system to be clamped to a fixed voltage prior to entering a power-down state;

the GPU coupled to the memory system and to the isolation circuit and configured to:

receive a command for the GPU to enter a sleep mode; and in response to receiving the command for the GPU to enter the sleep mode, performing the steps of:

save an internal processing state of the GPU to the memory system;

cause a first communications bus that couples the GPU to a central processing unit (CPU) to be disabled;

cause at least one memory device included in the memory system to enter a self-refresh mode;

transmit a signal to an embedded controller to enable a second communications bus that couples the embedded controller to the GPU;

enter the power-down state;

enter a power-on state;

determine that the power-on state is associated with a sleep mode;

cause the first communications bus to be enabled;

cause the at least one memory device included in the memory system to exit the self-refresh mode; and load the internal processing state for the GPU from the memory system to the GPU.

* * * * *